(12) United States Patent
Deng (10) Patent No.: US 11,614,737 B2
(45) Date of Patent: Mar. 28, 2023

(54) VEHICLE CONTROLLING METHOD AND APPARATUS, COMPUTER DEVICE, AND STORAGE MEDIUM

(71) Applicant: BAIDU ONLINE NETWORK TECHNOLOGY (BEIJING) CO., LTD., Beijing (CN)

(72) Inventor: Xiaofan Deng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 259 days.

(21) Appl. No.: 16/552,933

(22) Filed: Aug. 27, 2019

(65) Prior Publication Data

US 2020/0073384 A1 Mar. 5, 2020

(30) Foreign Application Priority Data

Aug. 30, 2018 (CN) .................. 201811005964.X (51) Int. Cl.
 *G05D 1/02* (2020.01)
 *G05D 1/00* (2006.01)
 *H04W 4/44* (2018.01)

(52) U.S. Cl.
 CPC ......... *G05D 1/0088* (2013.01); *G05D 1/0061* (2013.01); *G05D 1/0276* (2013.01); *G05D 2201/0213* (2013.01); *H04W 4/44* (2018.02)

(58) Field of Classification Search
 CPC .. G05D 1/0088; G05D 1/0061; G05D 1/0276; G05D 2201/0213; H04W 4/44
 See application file for complete search history.

(56) References Cited

U.S. PATENT DOCUMENTS

| 8,825,265 B1 | 9/2014 | Ferguson et al. |
| 2015/0203109 A1 | 7/2015 | McClain et al. |

(Continued)

FOREIGN PATENT DOCUMENTS

| CN | 101372230 A | 2/2009 |
| CN | 104245463 A | 12/2014 |

(Continued)

OTHER PUBLICATIONS

European Patent Application No. 19191625.3, partial Search and Opinion dated Dec. 11, 2019, 18 pages.

(Continued)

*Primary Examiner* — Peter D Nolan
*Assistant Examiner* — Roy Rhee
(74) *Attorney, Agent, or Firm* — Cozen O'Connor (57) ABSTRACT

A vehicle controlling method is provided, which may include: determining current vehicle status information, road condition information and environment information of a road on which the vehicle runs according to data collected by vehicle sensors; processing the current vehicle status information, the road condition information and the environment information according to a preset control strategy model to generate a first operating strategy of the vehicle within a preset time period; determining status adjustment modes of executing mechanisms of the vehicle according to the first operating strategy within the preset time period and a current second operating strategy of the vehicle; and adjusting the first operating strategy when the status adjustment mode of at least one executing mechanism does not meet a preset condition.

11 Claims, 5 Drawing Sheets

(56) References Cited

U.S. PATENT DOCUMENTS

| | | | |
|---|---|---|---|
| 2018/0088576 A1 | 3/2018 | Kong et al. | |
| 2018/0194349 A1 | 7/2018 | McGill | |
| 2019/0382029 A1* | 12/2019 | Golov | G06K 9/00805 |
| 2019/0384303 A1* | 12/2019 | Muller | G06K 9/00791 |
| 2020/0406925 A1* | 12/2020 | Du | B60W 30/143 |

FOREIGN PATENT DOCUMENTS

| | | |
|---|---|---|
| CN | 105936294 A | 9/2016 |
| CN | 106068215 A | 11/2016 |
| CN | 106564495 A | 4/2017 |
| CN | 107472248 A | 12/2017 |
| CN | 108137006 A | 6/2018 |
| JP | H11105579 A | 4/1999 |
| JP | 2002032125 A | 1/2002 |
| JP | 200426097 A | 1/2004 |
| WO | WO 2013107978 A1 | 7/2013 |

OTHER PUBLICATIONS

Chinese Patent Application No. 201811005964.X, English translation of First Office Action dated Jun. 16, 2020, 9 pages.
Japanese Patent Application No. 2019116849 First Office Action dated Aug. 4, 2020, 4 pages.
European Patent Application No. 19191625.3, Office Action dated Dec. 10, 2021, 9 pages.

\* cited by examiner

VEHICLE CONTROLLING METHOD AND APPARATUS, COMPUTER DEVICE, AND STORAGE MEDIUM

CROSS-REFERENCE TO RELATED APPLICATION

This application claims priority to and benefits of Chinese Patent Application Serial No. 201811005964.X, filed with the National Intellectual Property Administration of P. R. China on Aug. 30, 2018, the entire content of which is incorporated herein by reference.

FIELD

The present disclosure relates to the field of autonomous (driverless) driving technology, and more particularly, to a vehicle controlling method and apparatus, a computer device, and a storage medium.

BACKGROUND

At present, autonomous driving of an intelligent vehicle is achieved by generating a driving strategy in real time based on current running scenarios with a well-trained control strategy, and controlling the vehicle according to the generated driving strategy.

However, as road environment is changeable, and driving habits from individual drivers are different, when training data are limited, the control strategy obtained thereby is restricted. Therefore, the autonomous driving implemented by using the current intelligent driving control method has poor smoothness, stability and adaptability under new running scenarios.

SUMMARY

According to a first aspect of embodiments of the present disclosure, there is provided a vehicle controlling method, including:

determining current vehicle status information, road condition information and environment information of a road on which the vehicle runs according to data collected by vehicle sensors;

processing the current vehicle status information, the road condition information and the environment information according to a preset control strategy model to generate a first operating strategy of the vehicle within a preset time period;

determining status adjustment modes of executing mechanisms of the vehicle according to the first operating strategy within the preset time period and a current second operating strategy of the vehicle; and adjusting the first operating strategy when the status adjustment mode of at least one executing mechanism does not meet a preset condition.

According to a second aspect of embodiments of the present disclosure, there is provided a vehicle controlling apparatus, including:

an information acquiring module, configured to determine current vehicle status information, road condition information and environment information of a road on which the vehicle runs according to data collected by vehicle sensors;

a generating module, configured to process the current vehicle status information, the road condition information and the environment information according to a preset control strategy model to generate a first operating strategy of the vehicle within a preset time period;

a mode determining module, configured to determine status adjustment modes of executing mechanisms of the vehicle according to the first operating strategy within the preset time period and a current second operating strategy of the vehicle; and a first adjusting module, configured to adjust the first operating strategy when the status adjustment mode of at least one executing mechanism does not meet a preset condition.

According to a third aspect of embodiments of the present disclosure, there is provided a computer device, including: a processor; and a memory for storing program codes executable by the processor. The processor is configured to read the program codes and execute a program corresponding to the program codes so as to implement the vehicle controlling method as described in any embodiment of the first aspect of the present disclosure.

According to a fourth aspect of embodiments of the present disclosure, there is provided a non-transitory computer-readable storage medium having stored therein computer programs that, when executed by a processor, causes the vehicle controlling method as described in any embodiment of the first aspect of the present disclosure to be performed.

According to a fifth aspect of embodiments of the present disclosure, there is provided a computer program product having instructions that, when executed by a processor, causes the vehicle controlling method as described in any embodiment of the first aspect of the present disclosure to be performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure, examples of which are illustrated in the accompanying drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the following text, a vehicle controlling method and apparatus, a computer device, and a storage medium according to embodiments of the present disclosure will be described in detail with reference to drawings.

Figure 1:
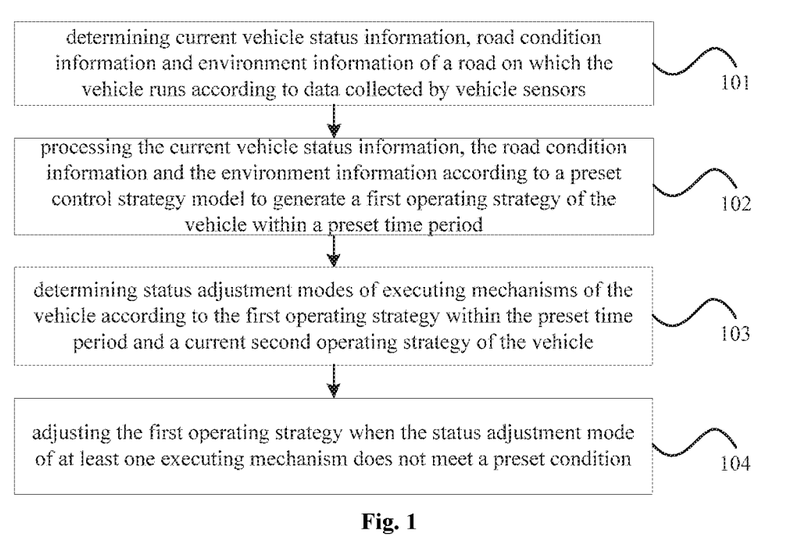
FIG. 1 is a flow chart of a vehicle controlling method according to an embodiment of the present disclosure.

FIG. 1 is a flow chart of a vehicle controlling method according to an embodiment of the present disclosure.

As shown in FIG. 1, the vehicle controlling method may include the following operations as illustrated at blocks of FIG. 1.

At block 101, current vehicle status information, road condition information and environment information of a road on which the vehicle runs are determined according to data collected by vehicle sensors.

For an autonomous vehicle or a driverless vehicle, when no manual control participates in a running process thereof, the vehicle needs to take over all the control power itself, and thus is required to have a good understanding of the surrounding environment. The autonomous vehicle or the driverless vehicle is equipped with a variety of sensors and relies on collaborative work of these sensors to ensure safe driving.

The autonomous vehicle or the driverless vehicle is provided with different types of sensors. For example, an image sensor is installed for providing visual and real image information and thus providing accurate environment information for the vehicle; a radar is installed for distance and speed measurements; a tire pressure sensor is installed for monitoring conditions of tires; and a distance sensor is installed for monitoring a stepping degree on a brake pedal, and so on. Therefore, in this embodiment, the data may be collected from the vehicle sensors such as the radar, the image sensor and so on; further, based on the data acquired from these vehicle sensors, current status information of components such as a software and/or a hardware, etc., of the vehicle, the road condition information and the environment information of the road on which the vehicle currently runs are determined. The current vehicle status information may include, for example, whether a hardware component is faulty, whether a software program can be executed properly, and the like.

At block 102, the current vehicle status information, the road condition information and the environment information are processed according to a preset control strategy model to generate a first operating strategy of the vehicle within a preset time period.

The control strategy model is pre-trained. A large amount of status information of the vehicle in operating process, the road condition information and the environment information may be collected in advance as training samples, and an initial model is trained using these training samples to obtain the control strategy model.

In this embodiment, the current vehicle status information, the road condition information and the environment information of the road on which the vehicle runs, after determined, are input into the preset control strategy model to process, as a result, the first operating strategy of the vehicle within the preset time period is obtained.

In an embodiment, the preset time period may be 3 seconds, 5 seconds, and so on, from the current time.

At block 103, status adjustment modes of executing mechanisms of the vehicle are determined according to the first operating strategy within the preset time period and a current second operating strategy of the vehicle.

The current second operating strategy of the vehicle may be determined according to current statuses of the executing mechanisms of the vehicle. For example, when a turning angle of a steering wheel of the vehicle is currently 45 degree to the left, and a stepping degree on a brake pedal is 30%, it can be determined that the current second operating strategy of the vehicle is to slow down and turn left.

In this embodiment, after the first operating strategy of the vehicle within the preset time period is determined, the first operating strategy may be compared with the current second operating strategy to determine the status adjustment modes of individual executing mechanisms of the vehicle.

For example, assuming that the first operating strategy includes stepping on an accelerator to control the vehicle to accelerate, while the second operating strategy includes stepping on the brake pedal to control the vehicle to decelerate, then it can be determined that the accelerator of the vehicle is about to be stepped on and the brake pedal will be released.

By way of another example, assuming that in the second operating strategy, the turning angle of the steering wheel is 30 degree to the left, while in the first operating strategy, the turning angle of the steering wheel is 100 degree to the right, then it can be determined that the status adjustment mode of the steering wheel is to reverse rapidly, indicating that the vehicle is about to turn sharply at a large angle, which is easy to cause traffic accidents, leading to a poor driving experience.

At block 104, the first operating strategy is adjusted when the status adjustment mode of at least one executing mechanism does not meet a preset condition.

The preset condition may be, for example, that the status adjustment modes of the executing mechanisms determined according to the first operating strategy and the second operating strategy do not conflict; or that an adjustment range of the executing mechanism does not exceed a preset value.

In this embodiment, after the status adjustment modes of the executing mechanisms are determined, the status adjustment mode of each executing mechanism may be compared with the preset condition so as to determine whether the status adjustment mode meets the preset condition, and when the status adjustment mode of at least one executing mechanism does not meet the preset condition, the first operating strategy is adjusted.

For example, assuming that the first operating strategy includes stepping on the accelerator to control the vehicle to accelerate, while the second operating strategy includes stepping on the brake pedal to control the vehicle to decelerate, then it can be determined that the accelerator of the vehicle is about to be stepped on and the brake pedal will be released, in such a case, the status adjustment modes are in conflict, not meeting the preset condition, the vehicle will be converted from deceleration to acceleration, and the determined first operating strategy may be considered to be inaccurate. Then, the first operating strategy may be adjusted to be stepping on the brake pedal to a degree less than that in the second operating strategy, thereby controlling the speed of the vehicle to change gradually and ensuring the vehicle to run smoothly.

By way of another example, assuming that a preset adjustment value of the steering wheel is 10 degree, and that in the second operating strategy, the turning angle of the steering wheel is 30 degree to the left, while in the first operating strategy, the turning angle of the steering wheel is 100 degree to the left, then it can be determined according to the first operating strategy in relative to the second operating strategy that an adjustment range of the steering wheel is 70 degree, which exceeds the preset adjustment value of 10 degree, not meeting the preset condition. In such a case, the first operating strategy may be adjusted, and the turning angle of the steering wheel in the first operating strategy is adjusted to be 40 degree to the left.

With the vehicle controlling method according to this embodiment, the current vehicle status information, the road condition information and the environment information of the road on which the vehicle runs are determined according to the data collected by the vehicle sensors, and are processed according to the preset control strategy model to generate the first operating strategy of the vehicle within the preset time period; further, based on the first operating strategy within the preset time period and the current second operating strategy of the vehicle, the status adjustment modes of the executing mechanisms of the vehicle are determined; and when the status adjustment mode of at least one executing mechanism does not meet the preset condition, the first operating strategy is adjusted. In this way, the status adjustment modes of the executing mechanisms of the vehicle are determined based on comparison of the predicted first operating strategy with the current second operating strategy, and when the status adjustment mode of at least one executing mechanism does not meet the preset condition, the first operating strategy is adjusted, which is capable of reducing the difference between the first operating strategy and the second operating strategy, and controlling the same executing mechanism to change gradually, thereby improving the smoothness, stability and adaptability in the autonomous driving process.

In order to further improve the smoothness and stability of the autonomous driving and the accuracy of control on the vehicle, in a possible implementation of embodiments of the present disclosure, the predicted first operating strategy may also be adjusted. Therefore, the present disclosure provides another embodiment of a vehicle controlling method.

Figure 2:
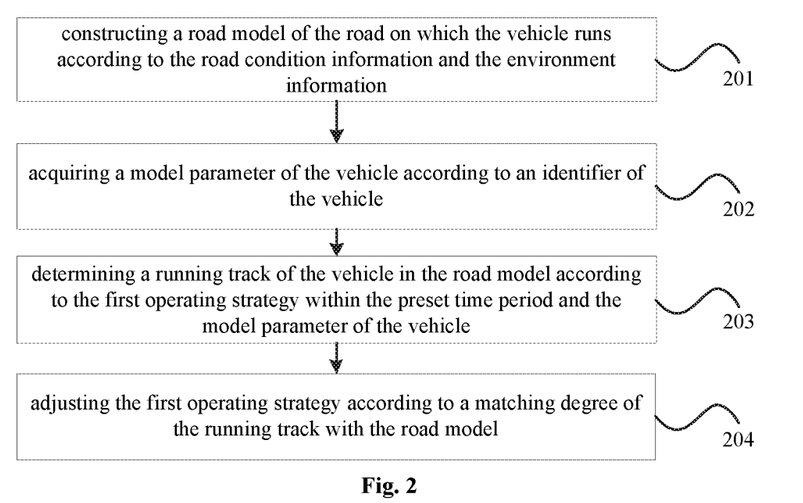
FIG. 2 is a flow chart of a vehicle controlling method according to an embodiment of the present disclosure.

FIG. 2 is a flow chart of a vehicle controlling method according to another embodiment of the present application.

As illustrated in FIG. 2, on the basis of the embodiment as illustrated in FIG. 1, subsequent to the operation as described at block 102, the vehicle controlling method may further include the following operations as illustrated at blocks of FIG. 2.

At block 201, a road model of the road on which the vehicle runs is constructed according to the road condition information and the environment information.

In this embodiment, the road model may be constructed using the determined road condition information and environment information of the road on which the vehicle runs. For example, the determined road condition information shows an upslope, an intersection 1 km away from the upslope, a left-turn path and a right-turn path at the intersection, the environment information shows a gas station located at an exit of the right-turn path, based on the environment information and the road condition information, a corresponding model of the road may be constructed in a certain scale, which also includes an upslope, an intersection, a left-turn path and a right-turn path at the intersection, a gas station located at an exit of the right-turn path.

It should be illustrated that, in this embodiment, an execution order of the operations illustrated at blocks 201 and 102 is not limited, and the operation illustrated at block 201 may be executed subsequent to, at the same time with, or prior to the operation illustrated at block 102. Therefore, the embodiment where the operation illustrated at block 201 is executed subsequent to the operation illustrated at block 102 is only illustrative, and shall not be construed to limit the present disclosure.

At block 202, a model parameter of the vehicle is acquired according to an identifier of the vehicle.

The model parameter of the vehicle includes, but is not limited to, profile parameters such as a vehicle height, a vehicle width, and a vehicle length, etc.

In general, different brands of vehicles and different series of vehicles with the same brand have different widths, lengths, or other profile parameters. Therefore, in this embodiment, the model parameter of the vehicle may be acquired according to the identifier of the vehicle. For example, mapping relationships between identifiers and model parameters of vehicles may be stored in advance, and a model parameter of a current vehicle may be determined by querying the mapping relationships according to an acquired identifier of the current vehicle.

At block 203, a running track of the vehicle in the road model is determined according to the first operating strategy within the preset time period and the model parameter of the vehicle.

When running on a same road, different vehicles such as saloon cars and off-road vehicles may be influenced by external obstacles from the same road to different degrees. Therefore, in this embodiment, the running track of the vehicle in the road model may be determined according to the first operating strategy within the preset time period and the model parameter of the vehicle.

At block 204, the first operating strategy is adjusted according to a matching degree of the running track with the road model.

In this embodiment, after the running track of the vehicle in the road model is determined, the first operating strategy may be adjusted according to the matching degree of the running track with the road model. For example, the first operating strategy is adjusted when the matching degree of the running track with the road model is lower than a preset matching threshold.

For example, the running track of the vehicle in the road model is to turn left after going straight, while the road model is to turn right after going straight, then the first operating strategy may be adjusted to turn left.

With the vehicle controlling method according to this embodiment, the road model of the road on which the vehicle runs is constructed according to the road condition information and the environment information; the model parameter of the vehicle is acquired according to the identifier of the vehicle; further, according to the first operating strategy within the preset time period and the model parameter of the vehicle, the running track of the vehicle in the road model is determined; and the first operating strategy is adjusted according to the matching degree of the running track with the road model, thereby improving the accuracy of the first operating strategy, and providing advantageous conditions for accurate control on the vehicle.

Figure 3:
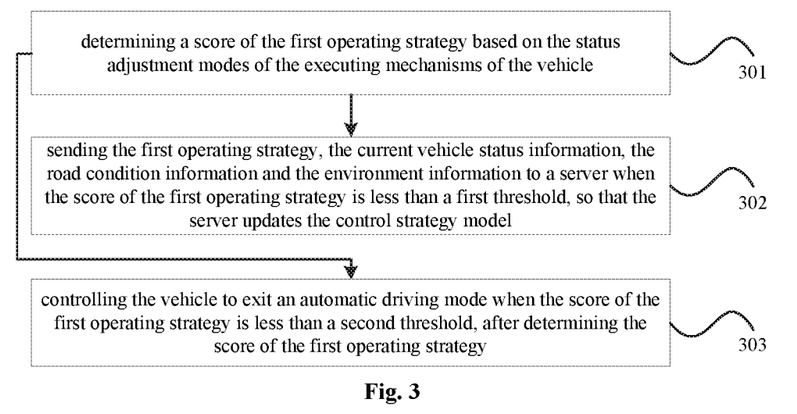
FIG. 3 is a flow chart of a vehicle controlling method according to an embodiment of the present disclosure.

FIG. 3 is a flow chart of a vehicle controlling method according to an embodiment of the present disclosure.

As illustrated in FIG. 3, on the basis of the embodiment as illustrated in FIG. 1, subsequent to the operation as described at block 103, the vehicle controlling method may further include the following operations as illustrated at blocks of FIG. 3.

At block 301, a score of the first operating strategy is determined based on the status adjustment modes of the executing mechanisms of the vehicle.

In this embodiment, after the status adjustment modes of the executing mechanisms of the vehicle are determined, the score of the first operating strategy may be determined according to the status adjustment modes of the executing mechanisms of the vehicle. For example, the more the number of the executing mechanisms whose status adjustment modes conflict is, the lower the score of the first operating strategy is; when the number of the executing mechanisms whose status adjustment modes conflict is certain, the greater the controlled change degree of the same executing mechanism is, the lower the score of the first operating strategy is.

At block 302, the first operating strategy, the current vehicle status information, the road condition information and the environment information are sent to a server when the score of the first operating strategy is less than a first threshold, so that the server updates the control strategy model.

At block 303, the vehicle is controlled to exit an autonomous driving mode when the score of the first operating strategy is less than a second threshold.

The first threshold and the second threshold may be preset, and the first threshold is not less than the second threshold.

In this embodiment, when the score of the first operating strategy is less than the first threshold, the first operating strategy, the current vehicle status information, the road condition information and the environment information are sent to the server, so that the server updates the control strategy model; and when the score of the first operating strategy is less than the second threshold, the vehicle is controlled to exit the autonomous driving mode.

As an example, the first threshold is greater than the second threshold. When the score of the first operating strategy is less than the first threshold but greater than or equal to the second threshold, the first operating strategy, the current vehicle status information, the road condition information and the environment information are sent to the server; and when the score of the first operating strategy is less than the second threshold, the vehicle is controlled to exit the autonomous driving mode.

As an example, the first threshold is equal to the second threshold. When the score of the first operating strategy is less than the first threshold, first operating strategy, the current vehicle status information, the road condition information and the environment information may be sent to the server, and the vehicle is controlled to exit the autonomous driving mode.

With the vehicle controlling method according to this embodiment, the score of the first operating strategy is determined according to the status adjustment modes of the executing mechanisms of the vehicle; when the score of the first operating strategy is less than the first threshold, the first operating strategy, the current vehicle status information, the road condition information and the environment information are sent to the server, so that the server updates the control strategy model; and when the score of the first operating strategy is less than the second threshold, the vehicle is controlled to exit the autonomous driving mode. Therefore, not only can the control strategy model be updated in time to improve the prediction accuracy of the first operating strategy, but also the running security of vehicle can be improved.

Figure 4:
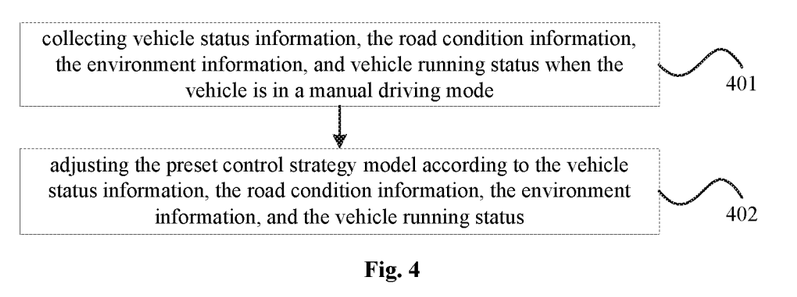
FIG. 4 is a flow chart of a vehicle controlling method according to an embodiment of the present disclosure.

Generally, besides the autonomous driving mode, the intelligent vehicle also supports a manual driving mode. Under the manual driving mode, a driver may actively control the vehicle based on situations such as road conditions. In certain embodiments of the present disclosure, when the vehicle operates in the manual driving mode, information including such as vehicle status information, road condition information and the like under this case may be collected for adjusting the control strategy model, so as to achieve personalized control on the vehicle according to driver' driving habits. Therefore, the present disclosure provides yet another embodiment of a vehicle controlling method. FIG. 4 is a flow chart of a vehicle controlling method according to yet another embodiment of the present disclosure.

As illustrated in FIG. 4, on the basis of embodiments as described hereinbefore, the vehicle controlling method may further include the following operations.

At block 401, vehicle status information, the road condition information, the environment information, and vehicle running status are collected when the vehicle is in a manual driving mode.

In this embodiment, when the vehicle is in the manual driving mode, the vehicle status information, the road condition information and the environment information of the road on which the vehicle runs, and vehicle running status may be determined according to the control of a driver on the vehicle and the data collected by the vehicle sensors. The vehicle running status may include such as a running speed, a turning direction, a turning angle, deceleration and acceleration, etc.

At block 402, the preset control strategy model is adjusted according to the vehicle status information, the road condition information, the environment information, and the vehicle running status.

In this embodiment, the preset control strategy model may be adjusted according to the collected vehicle status information, the road condition information, the environment information, and the vehicle running status, so as to make the first operating strategy generated based on the control strategy model conform to driver' driving habits, thereby realizing personalized control on the vehicle.

With the vehicle controlling method according to this embodiment, the vehicle status information, the road condition information, the environment information, and vehicle running status are collected when the vehicle is in the manual driving mode; and the preset control strategy model may be adjusted according to the vehicle status information, the road condition information, the environment information, and the vehicle running status, so that the first operating strategy generated based on the control strategy model conforms to driver' driving habits, thereby realizing personalized control on the vehicle, and improving the user experience.

In order to implement the vehicle controlling method as described in any embodiment hereinbefore, embodiments of the present disclosure further provide a vehicle controlling apparatus.

Figure 5:
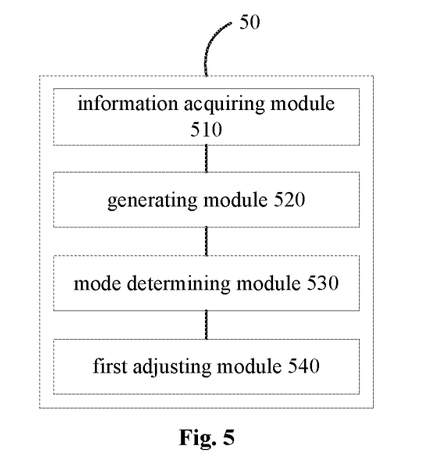
FIG. 5 is a block diagram of a vehicle controlling apparatus according to an embodiment of the present disclosure.

FIG. 5 is a block diagram of a vehicle controlling apparatus according to an embodiment of the present disclosure.

As illustrated in FIG. 5, the vehicle controlling apparatus 50 includes: an information acquiring module 510, a generating module 520, a mode determining module 530 and a first adjusting module 540.

The information acquiring module 510 is configured to determine current vehicle status information, road condition information and environment information of a road on which the vehicle runs according to data collected by vehicle sensors.

The generating module 520 is configured to process the current vehicle status information, the road condition information and the environment information according to a preset control strategy model to generate a first operating strategy of the vehicle within a preset time period.

The mode determining module 530 is configured to determine status adjustment modes of executing mechanisms of the vehicle according to the first operating strategy within the preset time period and a current second operating strategy of the vehicle.

The first adjusting module 540 is configured to adjust the first operating strategy when the status adjustment mode of at least one executing mechanism does not meet a preset condition.

Figure 6:
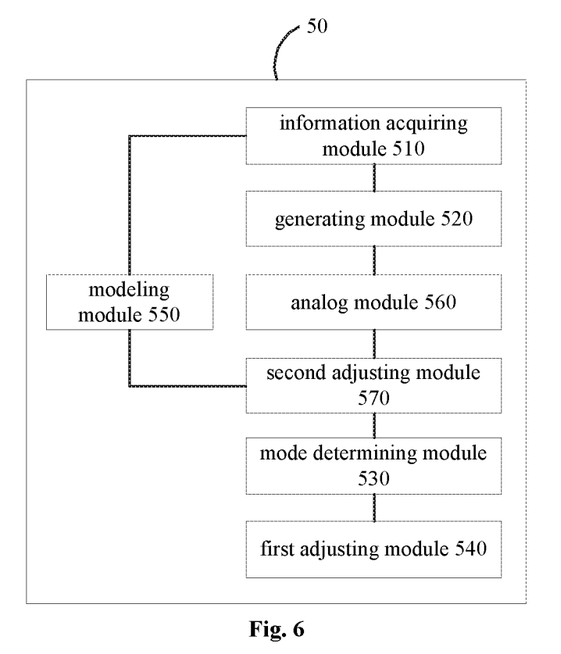
FIG. 6 is a block diagram of a vehicle controlling apparatus according to an embodiment of the present disclosure.

Further, in a possible implementation of embodiments of the present disclosure, as illustrated in FIG. 6, on the basis of the embodiment as illustrated in FIG. 5, the vehicle controlling apparatus 50 may further includes: a modeling module 550, an analog module 560, and a second adjusting module 570.

The modeling module 550 is configured to construct a road model of the road on which the vehicle runs according to the road condition information and the environment information.

The analog module 560 is configured to acquire a model parameter of the vehicle according to an identifier of the vehicle, and determine a running track of the vehicle in the road model according to the first operating strategy within the preset time period and the model parameter of the vehicle.

The second adjusting module 570 is configured to adjust the first operating strategy according to a matching degree of the running track with the road model.

In this embodiment, the mode determining module 530 is configured to determine the status adjustment modes of the executing mechanisms of the vehicle according to the first operating strategy after adjusted by the second adjusting module 570 and the current second operating strategy of the vehicle.

With the vehicle controlling apparatus according to this embodiment, the road model of the road on which the vehicle runs is constructed according to the road condition information and the environment information; the running track of the vehicle in the road model is determined according to the first operating strategy within the preset time period and the model parameter of the vehicle; and the first operating strategy is adjusted according to the matching degree of the running track with the road model, thereby improving the accuracy of the first operating strategy, and providing advantageous conditions for accurate control on the vehicle.

Figure 7:
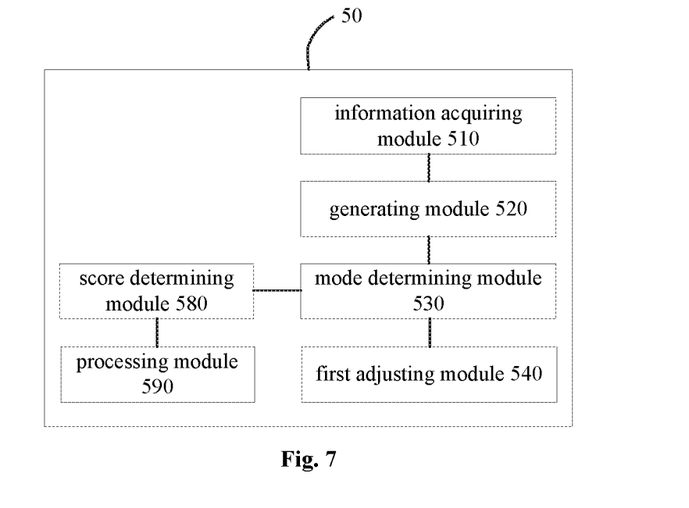
FIG. 7 is a block diagram of a vehicle controlling apparatus according to an embodiment of the present disclosure.

In a possible implementation of embodiments of the present disclosure, as illustrated in FIG. 7, on the basis of the embodiment as illustrated in FIG. 5, the vehicle controlling apparatus 50 may further includes: a score determining module 580 and a processing module 590.

The score determining module 580 is configured to determine a score of the first operating strategy based on the status adjustment modes of the executing mechanisms of the vehicle.

The processing module 590 is configured to send the first operating strategy, the current vehicle status information, the road condition information and the environment information to a server when the score of the first operating strategy is less than a first threshold, so that the server updates the control strategy model.

Further, the processing module 590 is further configured to control the vehicle to exit an autonomous driving mode when the score of the first operating strategy is less than a second threshold.

With the vehicle controlling apparatus according to this embodiment, the score of the first operating strategy is determined according to the status adjustment modes of the executing mechanisms of the vehicle; when the score of the first operating strategy is less than the first threshold, the first operating strategy, the current vehicle status information, the road condition information and the environment information are sent to the server, so that the server updates the control strategy model; and when the score of the first operating strategy is less than the second threshold, the vehicle is controlled to exit the autonomous driving mode. Therefore, not only can the control strategy model be updated in time to improve the prediction accuracy of the first operating strategy, but also the running security of vehicle can be improved.

Figure 8:
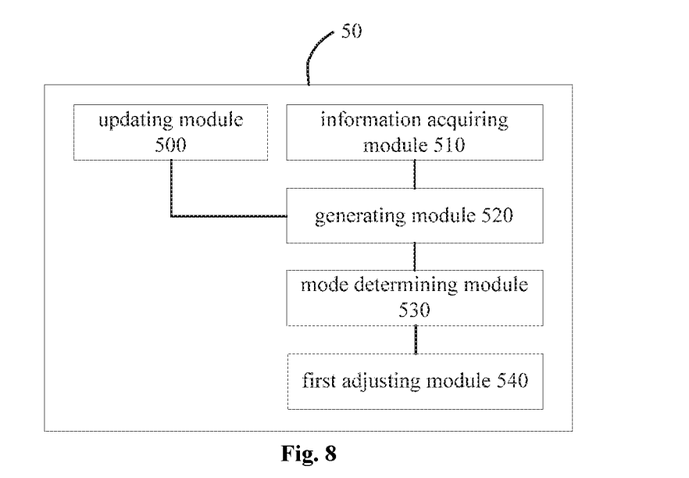
FIG. 8 is a block diagram of a vehicle controlling apparatus according to an embodiment of the present disclosure.

In a possible implementation of embodiments of the present disclosure, as illustrated in FIG. 8, on the basis of the embodiment as illustrated in FIG. 5, the vehicle controlling apparatus 50 may further includes an updating module 500.

The updating module 500 is configured to collect vehicle status information, the road condition information, the environment information, and vehicle running status when the vehicle is in a manual driving mode; and adjust the preset control strategy model according to the vehicle status information, the road condition information, the environment information, and the vehicle running status.

With the vehicle controlling apparatus according to this embodiment, the vehicle status information, the road condition information, the environment information, and vehicle running status are collected when the vehicle is in the manual driving mode; and the preset control strategy model may be adjusted according to the vehicle status information, the road condition information, the environment information, and the vehicle running status, so that the first operating strategy generated based on the control strategy model conforms to driver' driving habits, thereby realizing personalized control on the vehicle, and improving the user experience.

It should be noted that, implementation principles of embodiments of the vehicle controlling apparatus are similar to that of the vehicle controlling method, and thus explanations and illustrations made hereinbefore for embodiments of the vehicle controlling method are also applicable to embodiments of the vehicle controlling apparatus, and will not be elaborated herein.

With the vehicle controlling apparatus according to embodiments of the present disclosure, the current vehicle status information, the road condition information and the environment information of the road on which the vehicle runs are determined according to the data collected by the vehicle sensors, and are processed according to the preset control strategy model to generate the first operating strategy of the vehicle within the preset time period; further, based on the first operating strategy within the preset time period and the current second operating strategy of the vehicle, the status adjustment modes of the executing mechanisms of the vehicle are determined; and when the status adjustment mode of at least one executing mechanism does not meet the preset condition, the first operating strategy is adjusted. In this way, the status adjustment modes of the executing mechanisms of the vehicle are determined based on comparison of the predicted first operating strategy with the current second operating strategy, and when the status adjustment mode of at least one executing mechanism does not meet the preset condition, the first operating strategy is adjusted, which is capable of reducing the difference between the first operating strategy and the second operating strategy, and controlling the same executing mechanism to change gradually, thereby improving the smoothness, stability and adaptability in the autonomous driving process.

Further, embodiments of the present disclosure also provide a computer device, including a processor; and a memory for storing program codes executable by the processor. The processor is configured to read the program codes and execute a program corresponding to the program codes, so as to implement the vehicle controlling method as described in any embodiment hereinbefore.

Figure 9:
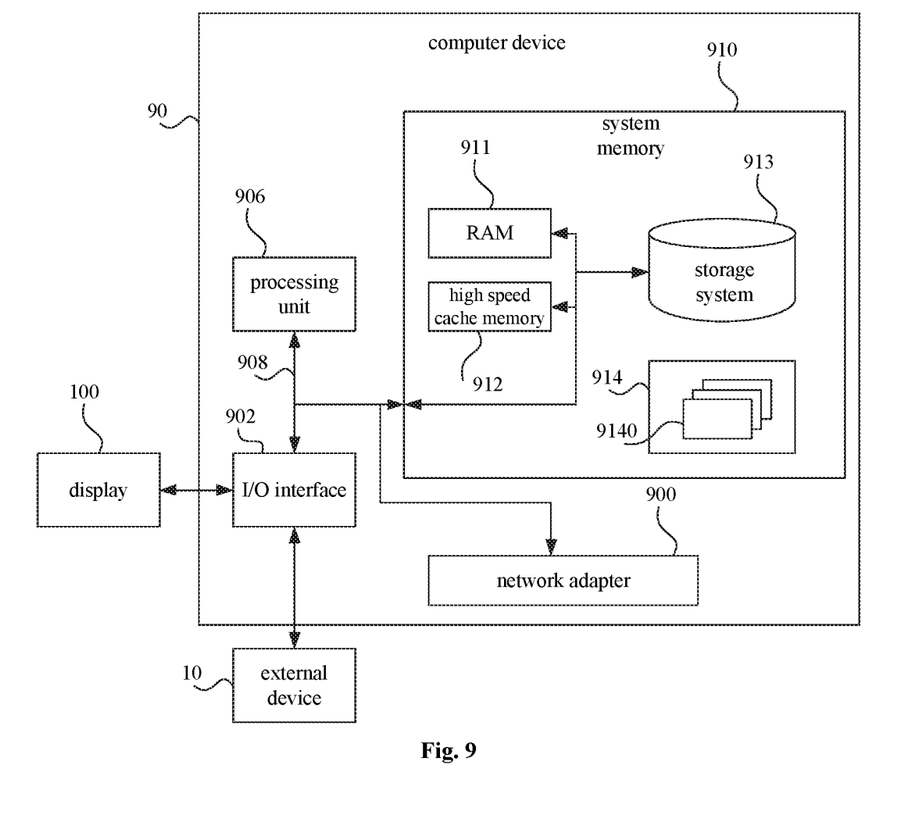
FIG. 9 is a block diagram of a computer device according to an embodiment of the present disclosure.

FIG. 9 illustrates a block diagram of a computer device 90 according to an embodiment of the present disclosure, which is suitable for implement embodiments of the present disclosure as described hereinbefore. The computer device 90 shown in FIG. 9 is merely an example, which should not be considered as a limitation of function and scope of embodiments of the present disclosure.

As illustrated in FIG. 9, the computer device 90 may be represented via a general computer device form. Components of the computer device 90 may include but are not limited to one or more processors or processing units 906, a system memory 910, a bus 908 connecting various system components including the system memory 910 and the processing units 906.

The bus 908 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 90 typically includes a variety of computer system readable media. These media may be any available media accessible by the computer device 90 and includes both volatile and non-volatile media, removable and non-removable media.

The system memory 910 may include a computer system readable medium in the form of volatile memory, such as a random access memory 911 (hereinafter referred to as RAM) and/or a high speed cache memory 912. The computer device 90 may further include other removable or non-removable, volatile or non-volatile computer system storage media. By way of example only, the storage system 913 may be configured to read and write a non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 908 via one or more data medium interfaces. The system memory 910 may include at least one program product. The program product has a set (such as, at least one) of program modules configured to perform the functions of various embodiments of the present disclosure.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages or a combination thereof. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server.

A program/utility 914 having a set (at least one) of the program modules 9140 may be stored in, for example, the system memory 910. The program modules 9140 include but are not limited to, an operating system, one or more application programs, other programs modules, and program data. Each of these examples, or some combination thereof, may include an implementation of a network environment. The program modules 9140 generally perform the functions and/or methods in the embodiments described herein.

The computer device 90 may also communicate with one or more external devices 10 (such as, a keyboard, a pointing device, a display 100, etc.). Furthermore, the computer device 90 may also communicate with one or more communication devices enabling a user to interact with the computer device 90 and/or other devices (such as a network card, modem, etc.) enabling the computer device 90 to communicate with one or more computer devices. This communication can be performed via the input/output (I/O) interface 902. Moreover, the computer device 90 may communicate with one or more networks (such as a local area network (hereafter referred to as LAN), a wide area network (hereafter referred to as WAN) and/or a public network such as an Internet) through a network adapter 900. As shown in FIG. 9, the network adapter 900 communicates with other modules of the computer device 90 over the bus 908. It should be understood that, although not shown in FIG. 9, other hardware and/or software modules may be used in connection with the computer device 90. The hardware and/or software includes, but is not limited to, microcode, device drivers, redundant processing units, external disk drive arrays, RAID systems, Drive and data backup storage system.

The processing unit 906 is configured to execute various functional applications and data processing by running programs stored in the system memory 910, for example, implementing the vehicle controlling method provided in embodiments of the present disclosure.

Further, embodiments of the present disclosure further provide a non-transitory computer-readable storage medium having stored therein computer programs that, when executed by a processor, causes the vehicle controlling method as described in any embodiment hereinbefore to be performed.

Further, embodiments of the present disclosure further provide a computer program product having instructions that, when executed by a processor, causes the vehicle controlling method as described in any embodiment hereinbefore to be performed.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, a phrase of "a plurality of" means two or more than two, such as two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step shown in the flow chart or described in other manners herein, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood by those ordinarily skilled in the art that all or part of the steps in the method of the above embodiments can be implemented by instructing related hardware via programs, the program may be stored in a computer readable storage medium, and the program includes one step or combinations of the steps of the method when the program is executed.

In addition, each functional unit in each embodiment of the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, modifications and variant can be made in the embodiments without departing from spirit, principles and scope of the present disclosure.

What is claimed is:

1. A method for controlling an autonomous vehicle, via a computer device comprising a processor and in communication with the autonomous vehicle, the method comprising:

determining, via a processor, current vehicle status information, road condition information and environment information of a road on which the vehicle runs according to data collected by vehicle sensors of the vehicle;

processing, via a preset control strategy model, the current vehicle status information, the road condition information and the environment information to generate a first operating strategy of the vehicle within a preset time period;

determining, via the processor, adjustment ranges of executing mechanisms for autonomously controlling the vehicle by comparing the first operating strategy within the preset time period with a current second operating strategy of the vehicle;

adjusting, via the processor, the first operating strategy when the adjustment ranges of at least one executing mechanism does not meet a preset condition; and autonomously operating the vehicle according to the adjusted first operating strategy to gradually adjust a speed, a direction or both speed and direction of the autonomous vehicle, where the method further comprises:

determining a score of the first operating strategy based on the adjustment ranges of the executing mechanisms of the vehicle;

sending the first operating strategy, the current vehicle status information, the road condition information and the environment information to a server when the score of the first operating strategy is less than a first threshold, so that the server updates the control strategy model; and controlling the vehicle to exit an autonomous driving mode when the score of the first operating strategy is less than a second threshold, wherein the first threshold is greater than the second threshold, and the preset condition is that the adjustment ranges of the executing mechanisms do not exceed corresponding preset values, wherein the autonomous vehicle comprises a steering wheel, and wherein determining, via the processor, the adjustment ranges of the executing mechanisms for autonomously controlling the vehicle by comparing the first operating strategy within the preset time period with the current second operating strategy of the vehicle further comprises:

determining, via the processor, an adjustment range of a turning angle of the steering wheel by comparing the first operating strategy with the current second operating strategy of the vehicle, wherein adjusting, via the processor, the first operating strategy when the adjustment ranges of at least one executing mechanism does not meet the preset condition further comprises:

adjusting, via the processor, the first operating strategy when the adjustment range of the turning angle of the steering wheel exceeds a preset adjustment value, wherein autonomously operating the vehicle according to the adjusted first operating strategy to gradually adjust the speed, the direction or both the speed and direction of the autonomous vehicle further comprises:

autonomously operating the vehicle according to the adjusted first operating strategy to gradually adjust the direction of the autonomous vehicle.

2. The vehicle controlling method according to claim 1, further comprising:

constructing a road model of the road on which the vehicle runs according to the road condition information and the environment information;

acquiring a model parameter of the vehicle according to an identifier of the vehicle;

determining a running track of the vehicle in the road model according to the first operating strategy within the preset time period and the model parameter of the vehicle; and adjusting the first operating strategy according to a matching degree of the running track with the road model, after generating the first operating strategy of the vehicle within the preset time period, wherein the model parameter of the vehicle comprises a vehicle height, a vehicle width, or a vehicle length.

3. The vehicle controlling method according to claim 1, further comprising:

collecting vehicle status information, the road condition information, the environment information, and vehicle running status when the vehicle is in a manual driving mode; and adjusting the preset control strategy model according to the vehicle status information, the road condition information, the environment information, and the vehicle running status.

4. The vehicle controlling method according to claim 2, further comprising:

collecting vehicle status information, the road condition information, the environment information, and vehicle running status when the vehicle is in a manual driving mode; and adjusting the preset control strategy model according to the vehicle status information, the road condition information, the environment information, and the vehicle running status.

5. A computer device for controlling an autonomous vehicle, comprising:

a processor; and a memory for storing program codes executable by the processor;

wherein the processor is configured to read the program codes and execute a program corresponding to the program codes so as to implement a vehicle controlling method, comprising:

determining current vehicle status information, road condition information and environment information of a road on which the vehicle runs according to data collected by vehicle sensors of the vehicle;

processing, via a preset control strategy model, the current vehicle status information, the road condition information and the environment information to generate a first operating strategy of the vehicle within a preset time period;

determining adjustment ranges of executing mechanisms for autonomously controlling the vehicle by comparing the first operating strategy within the preset time period with a current second operating strategy of the vehicle;

adjusting the first operating strategy when the adjustment ranges of at least one executing mechanism does not meet a preset condition; and autonomously operating the vehicle according to the adjusted first operating strategy to gradually adjust a speed, a direction or both speed and direction of the autonomous vehicle, where the method further comprises:

determining a score of the first operating strategy based on the adjustment ranges of the executing mechanisms of the vehicle;

sending the first operating strategy, the current vehicle status information, the road condition information and the environment information to a server when the score of the first operating strategy is less than a first threshold, so that the server updates the control strategy model; and controlling the vehicle to exit an autonomous driving mode when the score of the first operating strategy is less than a second threshold, wherein the first threshold is greater than the second threshold, and the preset condition is that the adjustment ranges of the executing mechanisms do not exceed corresponding preset values, wherein the autonomous vehicle comprises a steering wheel, and wherein determining the adjustment ranges of the executing mechanisms for autonomously controlling the vehicle by comparing the first operating strategy within the preset time period with the current second operating strategy of the vehicle further comprises:

determining an adjustment range of a turning angle of the steering wheel by comparing the first operating strategy with the current second operating strategy of the vehicle, wherein adjusting the first operating strategy when the adjustment ranges of at least one executing mechanism does not meet the preset condition further comprises:

adjusting the first operating strategy when the adjustment range of the turning angle of the steering wheel exceeds a preset adjustment value, wherein autonomously operating the vehicle according to the adjusted first operating strategy to gradually adjust the speed, the direction or both the speed and direction of the autonomous vehicle further comprises:

autonomously operating the vehicle according to the adjusted first operating strategy to gradually adjust the direction of the autonomous vehicle.

6. The computer device according to claim 5, wherein the vehicle controlling method further comprises:

constructing a road model of the road on which the vehicle runs according to the road condition information and the environment information;

acquiring a model parameter of the vehicle according to an identifier of the vehicle;

determining a running track of the vehicle in the road model according to the first operating strategy within the preset time period and the model parameter of the vehicle; and adjusting the first operating strategy according to a matching degree of the running track with the road model, after generating the first operating strategy of the vehicle within the preset time period, wherein the model parameter of the vehicle comprises a vehicle height, a vehicle width, or a vehicle length.

7. The computer device according to claim 5, wherein the vehicle controlling method further comprises:

collecting vehicle status information, the road condition information, the environment information, and vehicle running status when the vehicle is in a manual driving mode; and adjusting the preset control strategy model according to the vehicle status information, the road condition information, the environment information, and the vehicle running status.

8. The computer device according to claim 6, wherein the vehicle controlling method further comprises:

collecting vehicle status information, the road condition information, the environment information, and vehicle running status when the vehicle is in a manual driving mode; and adjusting the preset control strategy model according to the vehicle status information, the road condition information, the environment information, and the vehicle running status.

9. A non-transitory computer-readable storage medium having stored therein computer programs that, when executed by a processor, causes a method for controlling an autonomous vehicle to be performed, wherein the vehicle controlling method comprises:

determining current vehicle status information, road condition information and environment information of a road on which the vehicle runs according to data collected by vehicle sensors of the vehicle;

processing, via a preset control strategy model, the current vehicle status information, the road condition information and the environment information to generate a first operating strategy of the vehicle within a preset time period;

determining adjustment ranges of executing mechanisms for autonomously controlling the vehicle by comparing the first operating strategy within the preset time period with a current second operating strategy of the vehicle;

adjusting the first operating strategy when the adjustment ranges of at least one executing mechanism does not meet a preset condition; and autonomously operating the vehicle according to the adjusted first operating strategy to gradually adjust a speed, a direction or both speed and direction of the autonomous vehicle, where the method further comprises:

determining a score of the first operating strategy based on the adjustment ranges of the executing mechanisms of the vehicle;

sending the first operating strategy, the current vehicle status information, the road condition information and the environment information to a server when the score of the first operating strategy is less than a first threshold, so that the server updates the control strategy model; and controlling the vehicle to exit an autonomous driving mode when the score of the first operating strategy is less than a second threshold, wherein the first threshold is greater than the second threshold, and the preset condition is that the adjustment ranges of the executing mechanism do not exceed corresponding preset values, wherein the autonomous vehicle comprises a steering wheel, and wherein determining the adjustment ranges of the executing mechanisms for autonomously controlling the vehicle by comparing the first operating strategy within the preset time period with the current second operating strategy of the vehicle further comprises:

determining an adjustment range of a turning angle of the steering wheel by comparing the first operating strategy with the current second operating strategy of the vehicle, wherein adjusting the first operating strategy when the adjustment ranges of at least one executing mechanism does not meet the preset condition further comprises:

adjusting the first operating strategy when the adjustment range of the turning angle of the steering wheel exceeds a preset adjustment value, wherein autonomously operating the vehicle according to the adjusted first operating strategy to gradually adjust the speed, the direction or both the speed and direction of the autonomous vehicle further comprises:

autonomously operating the vehicle according to the adjusted first operating strategy to gradually adjust the direction of the autonomous vehicle.

10. The non-transitory computer-readable storage medium according to claim 9, wherein the vehicle controlling method further comprises:

constructing a road model of the road on which the vehicle runs according to the road condition information and the environment information;

acquiring a model parameter of the vehicle according to an identifier of the vehicle;

determining a running track of the vehicle in the road model according to the first operating strategy within the preset time period and the model parameter of the vehicle; and adjusting the first operating strategy according to a matching degree of the running track with the road model, after generating the first operating strategy of the vehicle within the preset time period, wherein the model parameter of the vehicle comprises a vehicle height, a vehicle width, or a vehicle length.

11. The non-transitory computer-readable storage medium according to claim 9, wherein the vehicle controlling method further comprises:

collecting vehicle status information, the road condition information, the environment information, and vehicle running status when the vehicle is in a manual driving mode; and adjusting the preset control strategy model according to the vehicle status information, the road condition information, the environment information, and the vehicle running status.

* * * * *